Dec. 5, 1933.　　　A. F. LARSEN　　　1,938,185
EGG COOKING UTENSIL
Filed Nov. 11, 1932　　　2 Sheets-Sheet 1

Inventor
Alantser F. Larsen

Dec. 5, 1933.   A. F. LARSEN   1,938,185
EGG COOKING UTENSIL
Filed Nov. 11, 1932   2 Sheets-Sheet 2
Fig. 3.
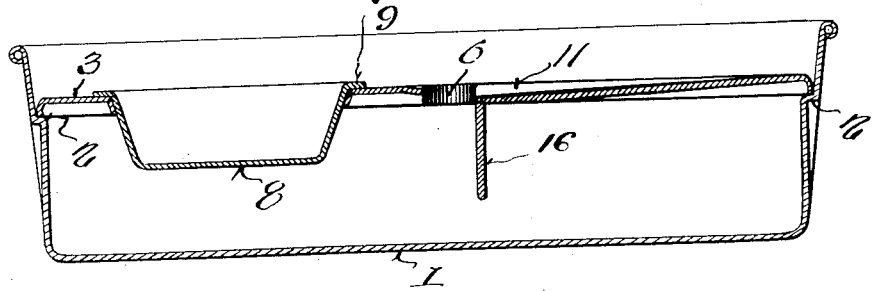
Fig. 4.
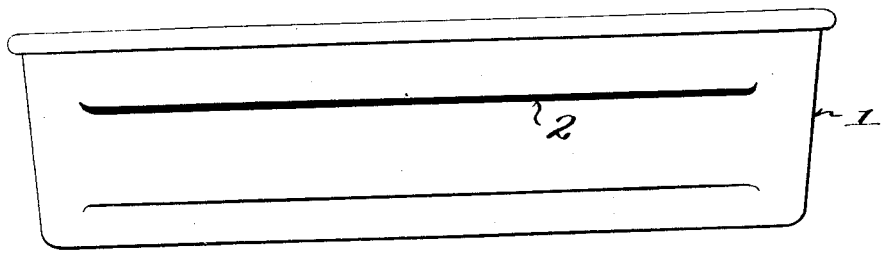
Fig. 5.   Fig. 7.   Fig. 8.
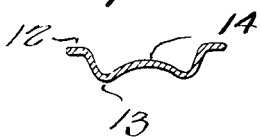      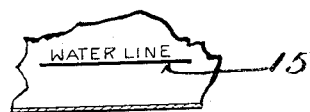
Fig. 6
Inventor
Alantser F. Larsen
By Young & Young
Attorneys

Patented Dec. 5, 1933

1,938,185

UNITED STATES PATENT OFFICE

1,938,185

EGG COOKING UTENSIL

Alantser F. Larsen, Manitowoc, Wis., assignor to Aluminum Goods Manufacturing Co., Manitowoc, Wis., a corporation of Wisconsin Application November 11, 1932
Serial No. 642,166

3 Claims. (Cl. 53—1)

This invention pertains to cooking utensils, and more particularly to what is known as an egg poacher.

The invention has primarily for its object to improve egg poachers by the provision of a cup tray positioned and supported entirely within an outer receptacle, and provided with means for draining condensation away from the cups and returning the same to the outer receptacle, thus preventing water from mixing with the eggs, which produces less desirable results.

Incidental to the foregoing, a more specific object resides in forming shoulders or ledges in opposite sides of the outer receptacle, intermediate its bottom and upper edge, for supporting the cup tray, thus permitting the use of a shallower outer receptacle, and allowing the cover to seat directly on the upper edge of the outer receptacle to provide the most efficient seal.

A still further object resides in the provision of means for determining a definite quantity of water within the outer vessel for the most efficient and uniform results.

Another object resides in attaining thorough circulation of steam in the vessel, whereby the contents of each cup is uniformly poached in a minimum period of time.

A still further object resides in the novel rectangular contour of the outer receptacle and insets, which permits a more compact and efficient utensil.

With the above and other objects in view, which will appear as the description proceeds, the invention resides in the novel construction, combination and arrangement of parts, substantially as hereinafter described and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings:—

Figure 3 is a transverse section taken on the line 3—3 of Figure 1.

Figure 4 is a side elevation of the outer receptacle illustrating one of the supporting shoulders for the inner tray.

Figure 5 is a detail section through the cover taken on the line 5—5 of Figure 2.

Figure 6 is a detail section through a portion of the inner tray, the same being taken on the line 6—6 of Figure 2.

Figure 7 is a fragmentary detail of the water indicator carried by the inner tray, and Figure 8 is a fragmentary section taken on the line 8—8 of Figure 1, illustrating the water indicator in the outer vessel.

Figures 1, 2:
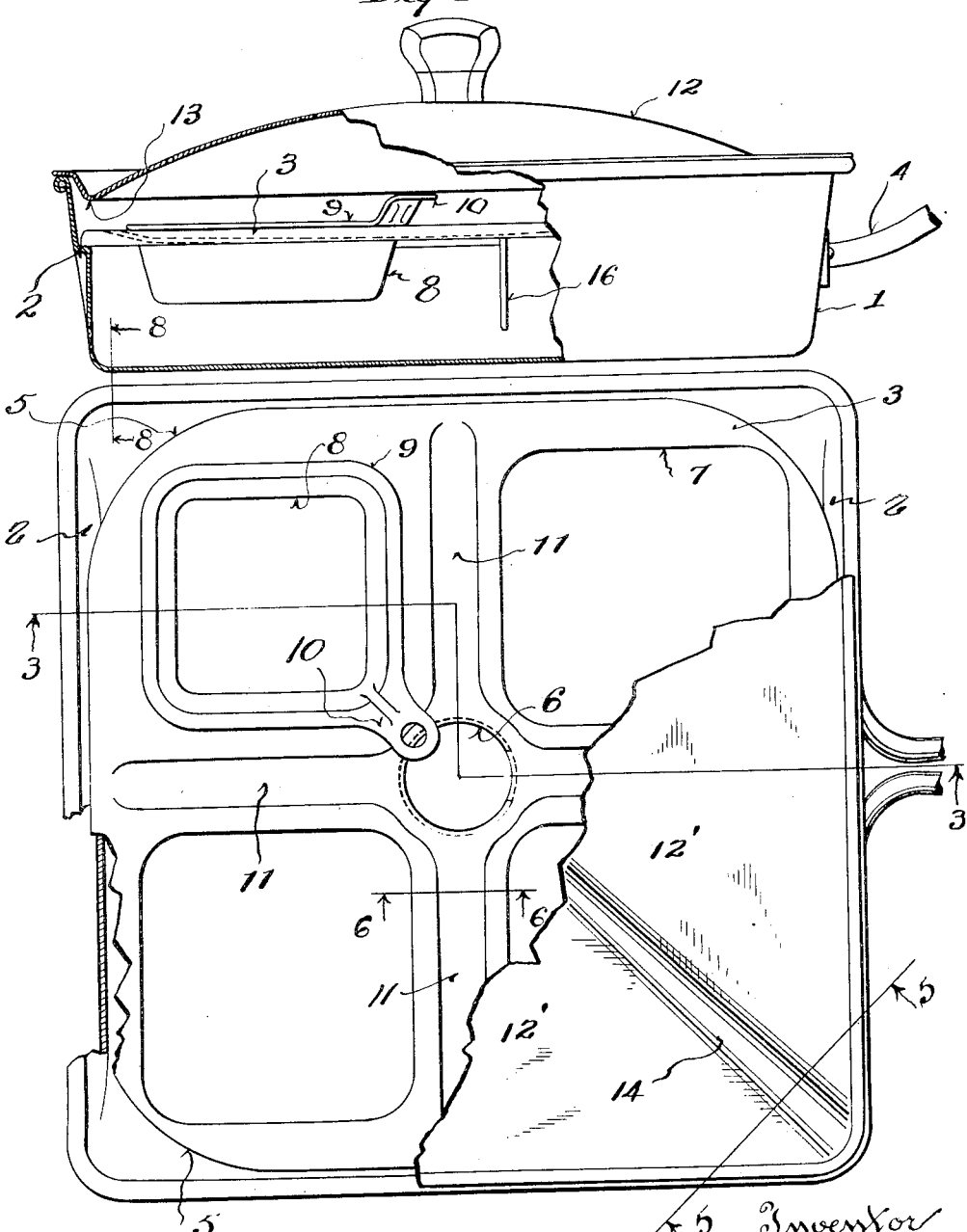
Figure 1 is an elevation of a utensil constructed in accordance with the present invention, parts being broken away and in section to more clearly illustrate structural features.
Figure 2 is a plan view of the same, with parts broken away and in section.

Referring now more particularly to the accompanying drawings, the numeral 1 indicates an outer receptacle, which is preferably rectangular in shape, although it is to be understood that the invention is not to be specifically limited to this particular contour, as certain features of the invention lend themselves to other shapes of receptacles. Heretofore, in conventional egg poachers, it has been customary to support the inner tray upon the edge of the outer receptacle, while the cover in turn seats on the tray. This is objectionable in that it does not provide a uniform, snug seat between the cover and the vessel, and, further, any slight distortion of the tray results in material leakage of steam.

To overcome the foregoing objections, the outer receptacle is provided with shoulders or ledges 2, preferably formed in opposite sides of the receptacle, intermediate its bottom and upper edge, for reception of an inner cup tray 3. The outer receptacle 1 may or may not be provided with the usual handle 4.

While the general contour of the inner tray 3 is rectangular, it will be noted that its corners are rounded at 5, thus providing openings between the tray and wall of the outer receptacle to provide for thorough circulation of steam both beneath and over the tray. Likewise the tray is provided with a center opening 6, which further facilitates circulation, and assists in draining condensation back to the outer receptacle, as will be described in further detail. The tray 3 is provided with a plurality of uniformly spaced, rectangular openings 7 for reception of the cups 8, which have their upper edges terminating in lateral lips 9 adapted to seat on the tray. To facilitate handling of the cups, the same are provided with handles 10 formed upwardly from the peripheral lips.

Adjacent the openings 7, the tray 3 has formed therein a plurality of converging troughs 11, which taper downwardly from the outer edge of the tray to the central opening 6, thus serving to drain condensation away from the cups 1 and return the same to the outer vessel, as hereinbefore stated. Obviously, the troughs 11 also serve to reinforce and add rigidity to the tray, which, for the purpose of economy, is formed from exceedingly light material.

The cover 12 is generally dome-shaped, and provided with a peripheral depression 13 disposed within the wall of the outer receptacle 1, thus preventing condensation from the cover from draining over the edge of the outer receptacle. More specifically the cover is arched upwardly from the peripheral trough 13, the respective sides 12' being flat longitudinally and converging in curved diagonal corners 14, thus causing condensation to drain from the cover at the peripheral trough 13, instead of draining into the cups, as would occur with a flat cover.

In use it is desirable to provide a uniform, predetermined quantity of water, sufficient to create the desired amount of steam within a minimum period, and therefore two methods have been provided for determining the quantity of water. In the first instance, a graduation or mark 15 is imprinted in one of the side walls of the outer receptacle 1. This graduation is utilized in the event that the water is placed into the receptacle prior to insertion of the tray 3.

In the event that water is introduced into the receptacle after the tray 3 has been inserted, the quantity is measured and determined by means of a depending lip 16 carried by the tray 3 adjacent the central opening 6. In this manner a uniform poaching operation is obtained at all times after the desired period of poaching for a given quantity of water is once determined.

From the foregoing explanation, taken in connection with the accompanying drawings, it will be readily seen that an exceedingly compact cooking utensil has been provided in which the vessel is securely sealed, and in which thorough circulation of steam and drainage of condensation away from the cups are obtained.

I claim:—

1. An egg poacher comprising a receptacle provided with horizontal shoulders in its side wall intermediate its bottom and upper edge, a tray provided with a central aperture supported on said shoulders and provided with a plurality of cup receiving openings concentrically arranged about said central aperture, removable cups supported in said openings, said tray being provided with means for draining condensation away from said cups to said central aperture, and a cover seated on the rim of said receptacle.

2. An egg poacher comprising a receptacle provided with spaced shoulders formed in its side wall intermediate its bottom and top edge, a tray supported on said shoulders and spaced from the side wall at certain points, a tray being provided with a plurality of cup receiving openings and a central aperture, inclined drain troughs adjacent to said openings for draining condensation away from the openings to said central aperture, cups supported in said openings, and a domed cover seated on the rim of said receptacle.

3. An egg poacher comprising, a receptacle provided with spaced horizontal shoulders in its side wall intermediate its bottom and upper edge, a tray provided with a central aperture, and a plurality of cup receiving openings surrounding said aperture, said tray being supported upon said shoulders, and being spaced from the side wall of said receptacle intermediate said shoulders, inclined troughs formed in said tray for draining condensation away from said cup openings to said central aperture, a depending gauge lip carried by said tray and visible through said aperture, cups supported in said openings, and a cover seated on the rim of said receptacle.

ALANTSER F. LARSEN.